Dec. 7, 1937.  E. A. BOLEN  2,101,570
CONFECTION MAKING MACHINE
Filed Nov. 26, 1934   8 Sheets—Sheet 1

Inventor:
Emerson A. Bolen
By
Wilson, Bowell, McCanna & Wintercorn
Attys.

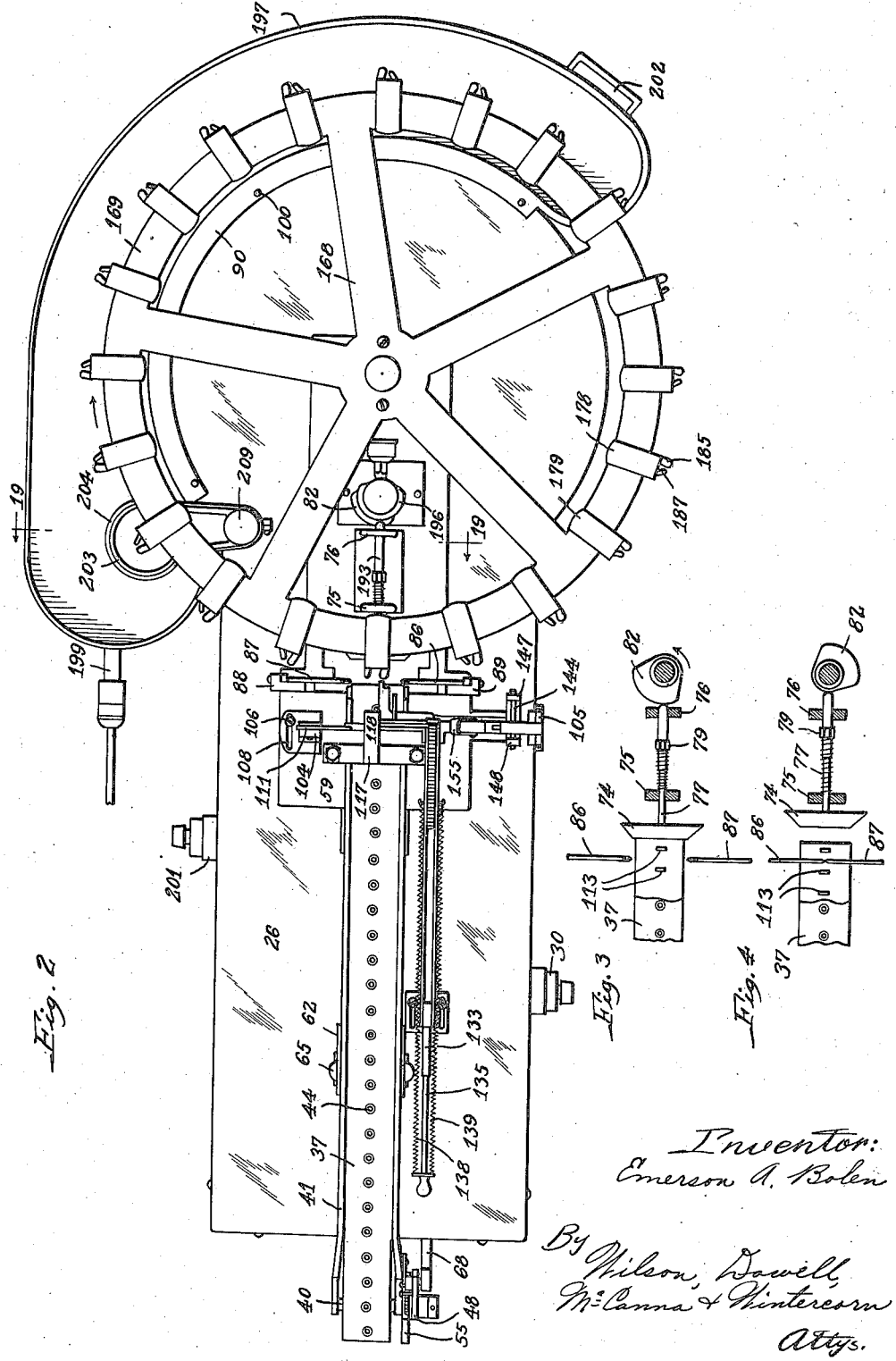

Dec. 7, 1937.                E. A. BOLEN                    2,101,570
                        CONFECTION MAKING MACHINE
                         Filed Nov. 26, 1934          8 Sheets-Sheet 3
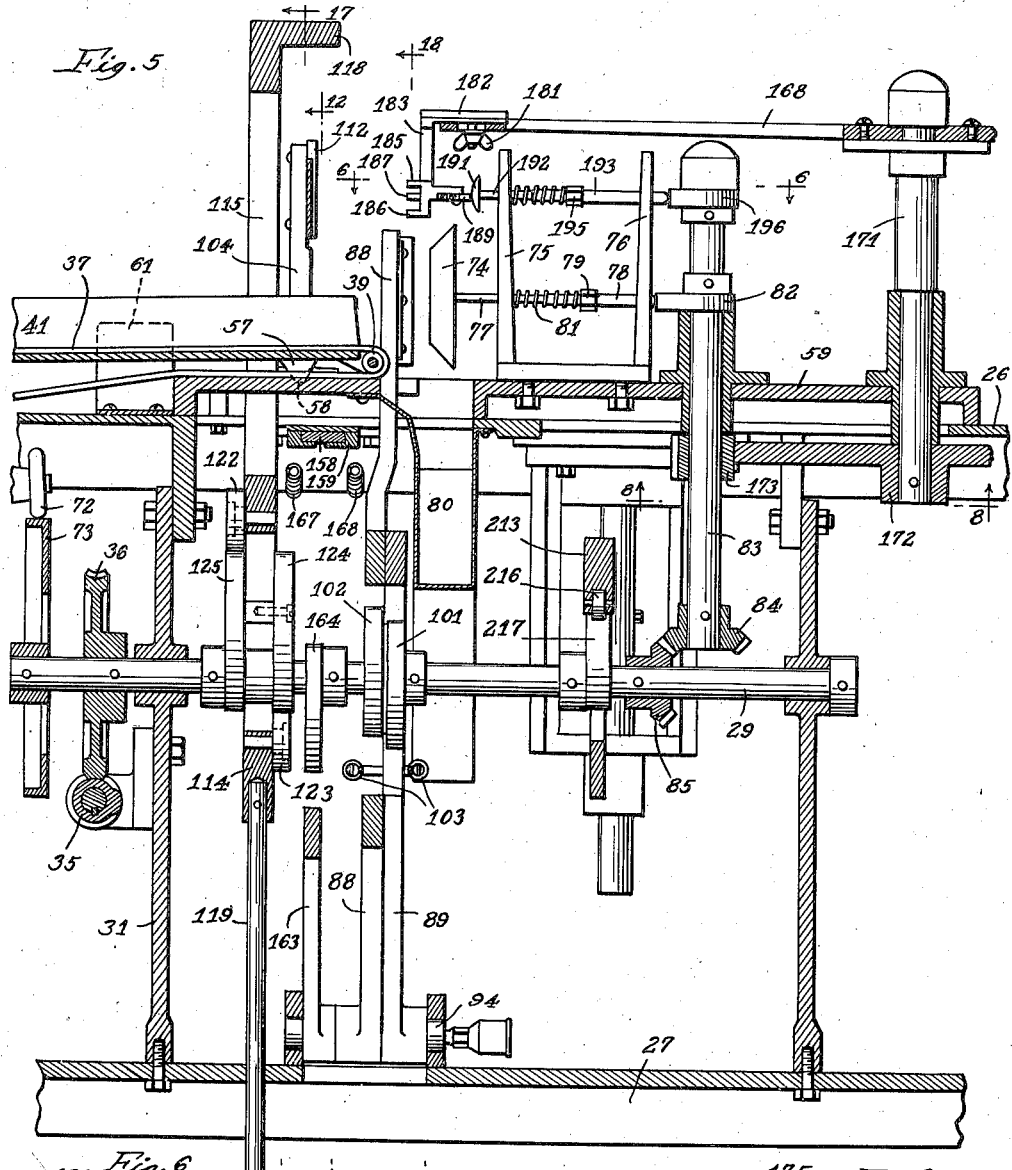
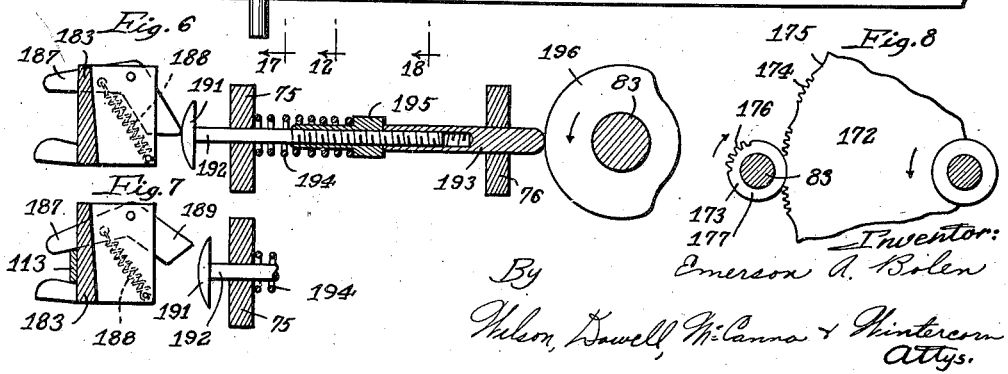
Inventor:
Emerson A. Bolen
By
Wilson, Dowell, McCanna & Wintercorn
Attys.

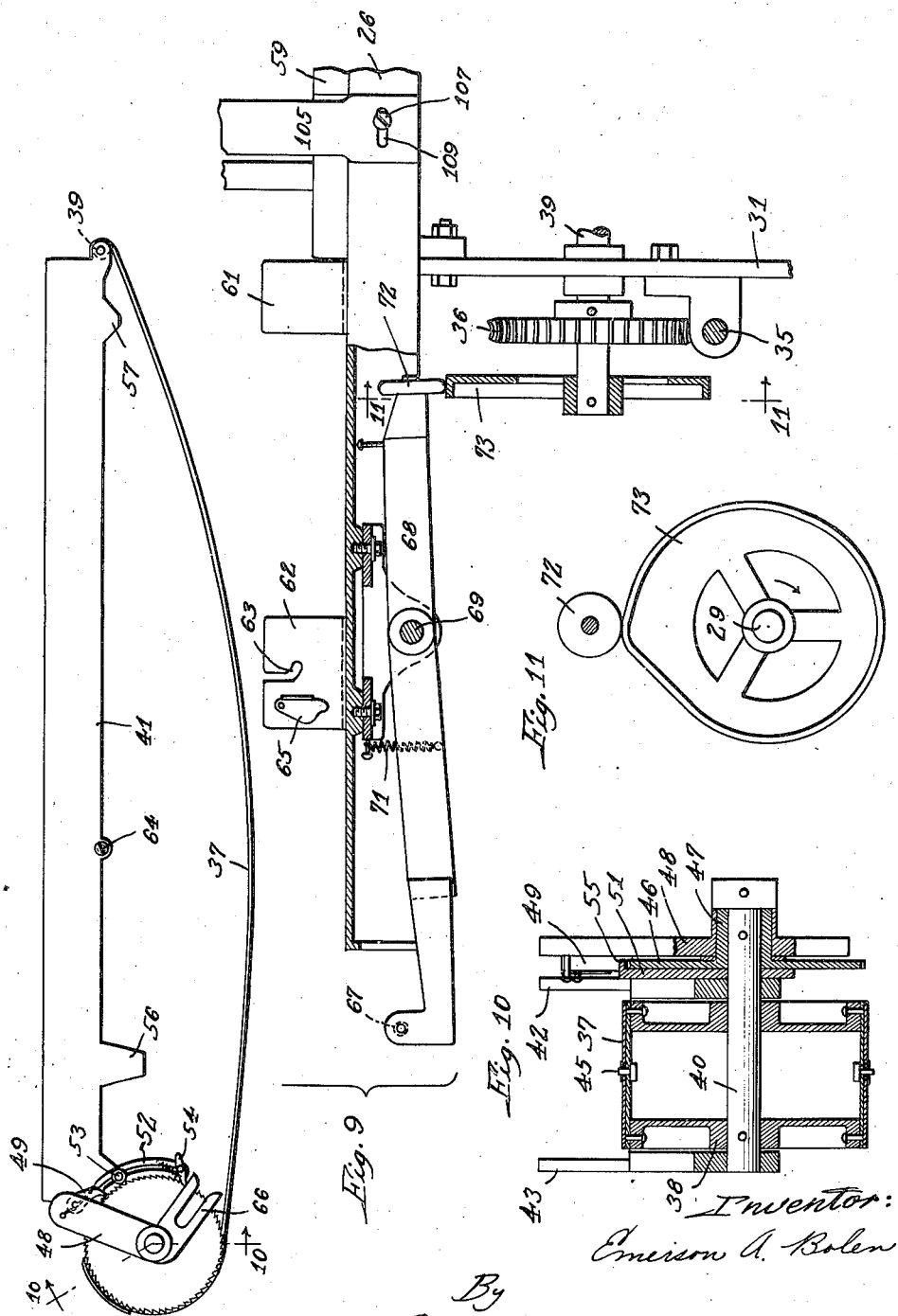

Dec. 7, 1937.  E. A. BOLEN  2,101,570
CONFECTION MAKING MACHINE
Filed Nov. 26, 1934   8 Sheets-Sheet 5
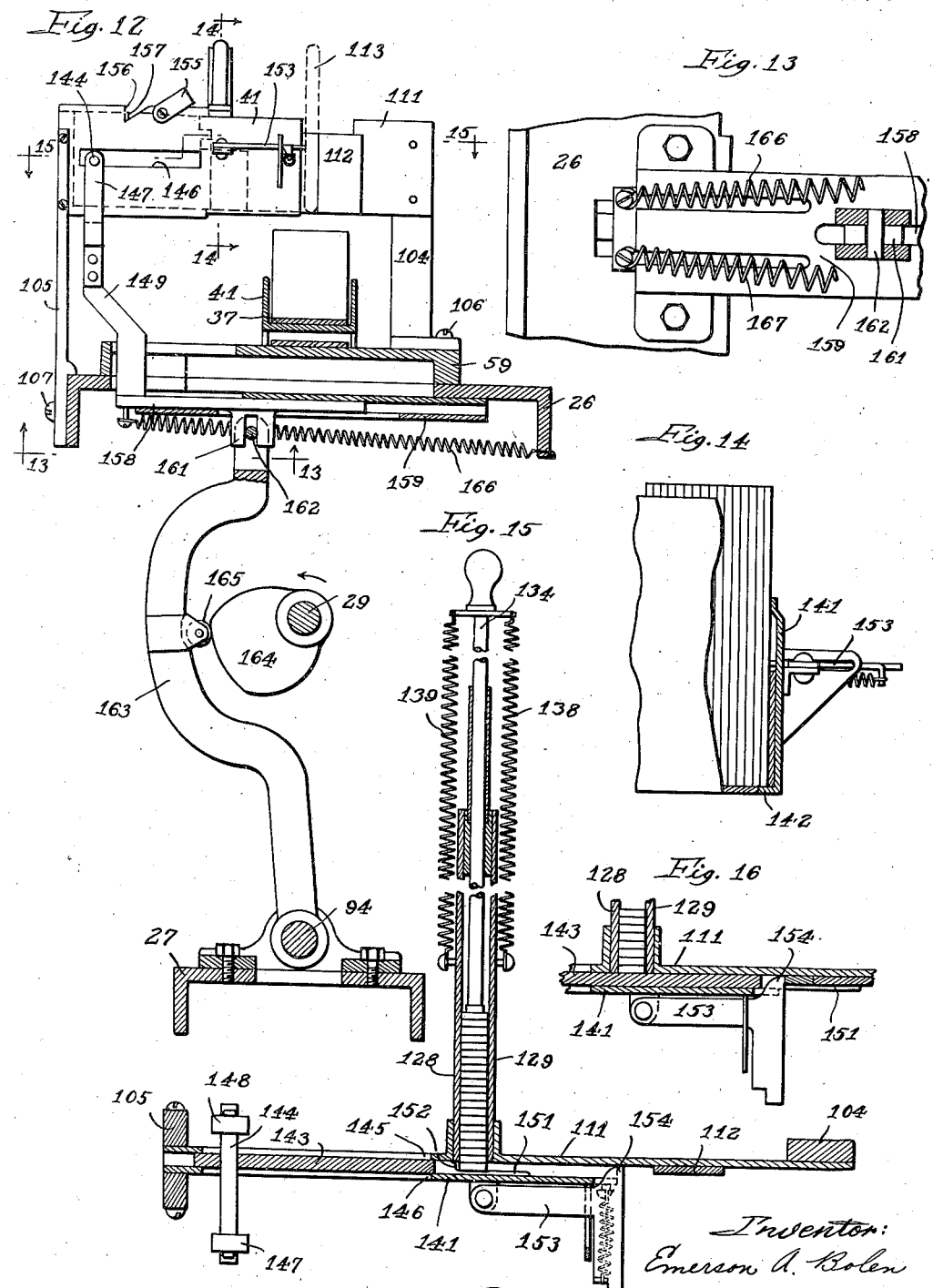
Inventor:
Emerson A. Bolen
By
Wilson, Dowell, McKenna & Wintercorn
Attys.

Dec. 7, 1937.  E. A. BOLEN  2,101,570
CONFECTION MAKING MACHINE
Filed Nov. 26, 1934　　8 Sheets-Sheet 6
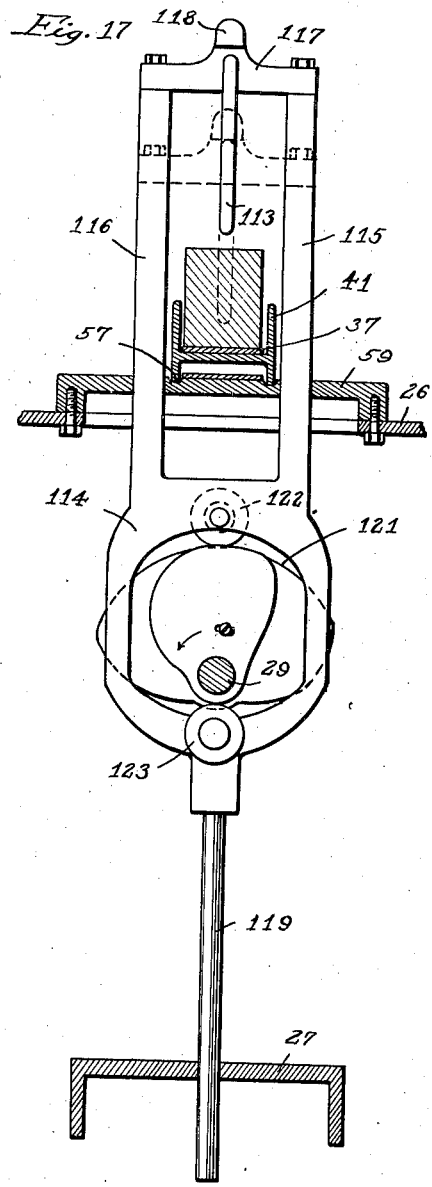
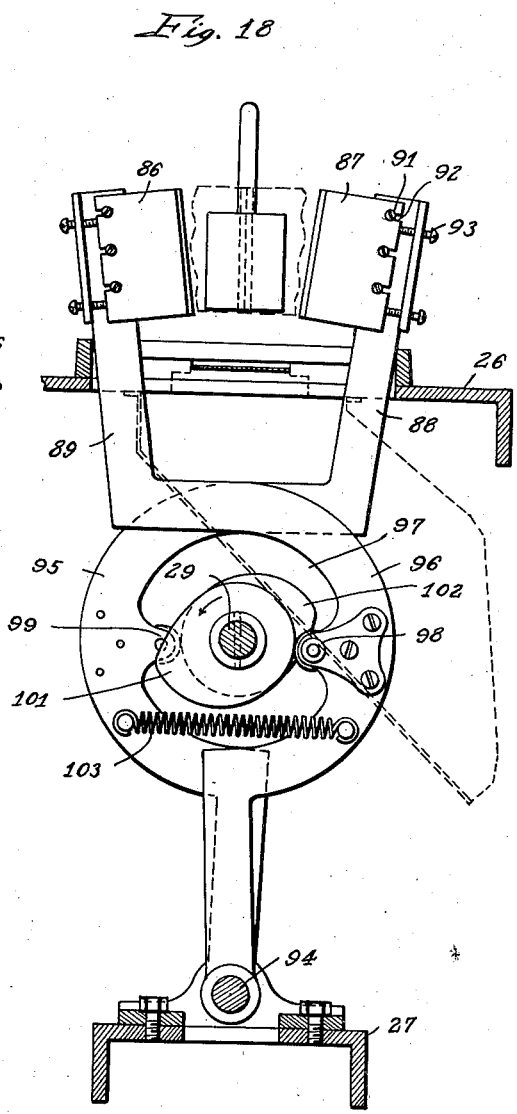
Inventor:
Emerson A. Bolen
By
Wilson, Dowell, McKanna & Winterson
Attys.

Dec. 7, 1937.                E. A. BOLEN                2,101,570
                       CONFECTION MAKING MACHINE
                         Filed Nov. 26, 1934        8 Sheets-Sheet 7
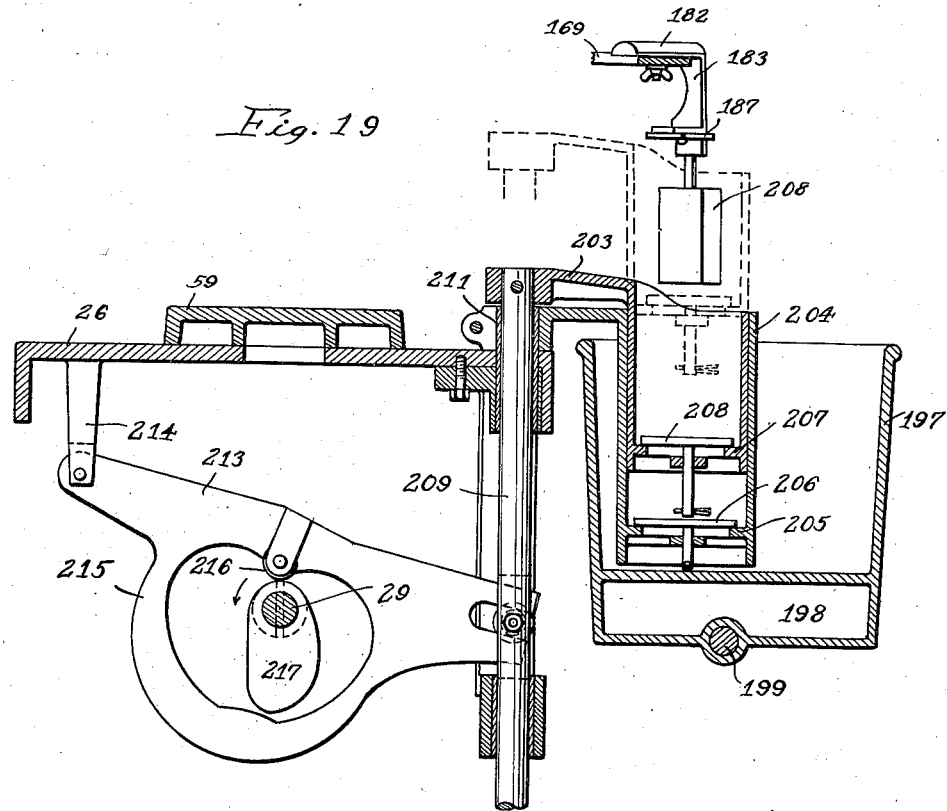
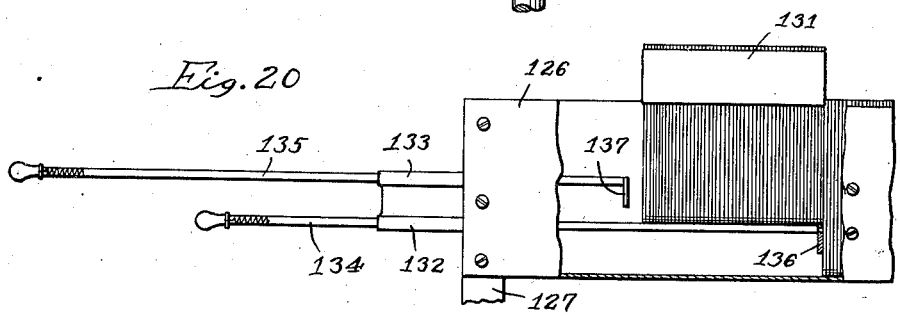
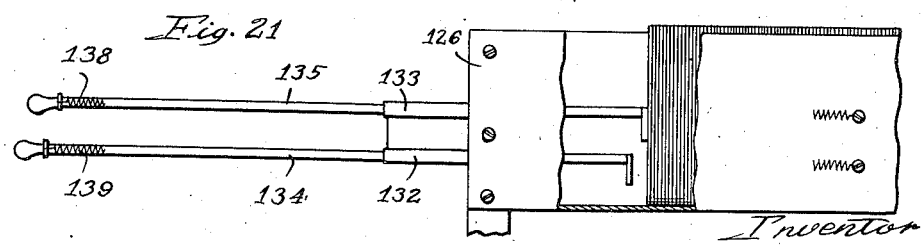

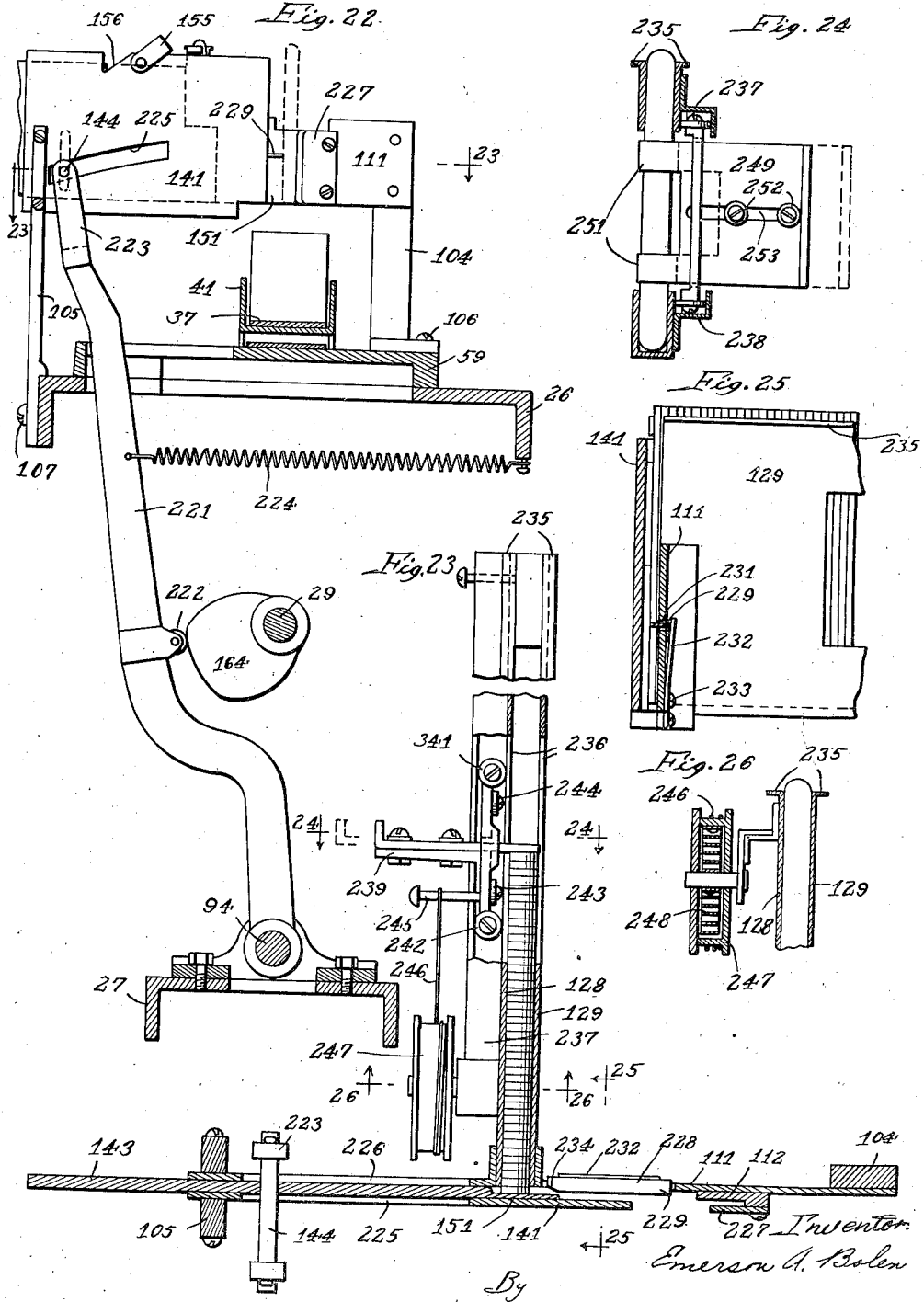

Patented Dec. 7, 1937

2,101,570

UNITED STATES PATENT OFFICE 2,101,570

CONFECTION MAKING MACHINE

Emerson A. Bolen, Morris, Ill., assignor, by mesne assignments, to Fred L. Borchert, Rockford, Ill.

Application November 26, 1934, Serial No. 754,731

22 Claims. (Cl. 107—21)

This invention relates to confection making machines, and has special reference to a machine for cutting, piercing and coating a confection, such as ice cream.

An object of the invention is the provision of a machine for automatically cutting bars from a slab of ice cream, piercing the bars with a stick, coating the bars while held by the stick and transporting the finished bars to a packaging station.

A further object of the invention is the provision of an improved feeding arrangement for moving the slab of ice cream forward through the cutters and for gauging the size of the bar.

Another object of the invention is the provision of improved means for inserting sticks into the bars and for feeding the sticks through the machine.

Another important aim of the invention is the provision of improved means for coating the bars and for agitating the coating composition by circulation of the same through the coating chamber to prevent accumulation therein of the by products of the coating operations.

A still further object of the invention is the provision of generally improved mechanism for transporting the bars from position to position and for taking up the bar at the loading station and discharging the same at the unloading station.

Other objects and advantages will be apparent from the following description and the drawings, in which—

Fig. 2 is a top view of the machine;

Figs. 3 and 4 are sections on the line 3—3 of Figure 1 showing the abutment member in its opposed positions;

Fig. 5 is a vertical section through the central or driving portion of the machine;

Figs. 6 and 7 are sections on the line 6—6 of Fig. 5 showing moved positions of the trigger mechanism;

Fig. 8 is a section on the line 8—8 of Fig. 5 showing the gears for imparting indexing motion to the transporting mechanism;

Fig. 9 is a side view of the feeding mechanism, partly in section, showing the manner in which the conveyer unit may be removed from the frame;

Fig. 10 is a section on the line 10—10 of Fig. 9;

Fig. 11 is a section on the line 11—11 of Fig. 9;

Fig. 12 is a section on the line 12—12 of Fig. 5 showing the stick feeding mechanism;

Fig. 13 is a view taken on the line 13—13 of Fig. 12;

Fig. 14 is a section on the line 14—14 of Fig. 12;

Fig. 15 is a section on the line 15—15 of Fig. 12;

Fig. 16 is a fragmentary section similar to Fig. 15 showing the parts in moved position;

Fig. 17 is a section on the line 17—17 showing the piercing mechanism;

Fig. 18 is a section on the line 18—18 of Fig. 5 showing the bar cutters and operating mechanism;

Fig. 19 is a section on the line 19—19 of Fig. 12 showing the coating mechanism;

Figs. 20 and 21 are side views of the stick feeding mechanism in moved positions, parts being broken away to show the manner of renewing the supply of sticks in the stick magazine;

Fig. 22 is a view similar to Fig. 12 showing a modified form of stick feeding mechanism;

Fig. 23 is a section on the line 23—23 of Fig. 22;

Fig. 24 is a section on the line 24—24 of Fig. 23;

Fig. 25 is a section on the line 25—25 of Fig. 23, and

Fig. 26 is a section on the line 26—26 of Fig. 23.

Figure 1:
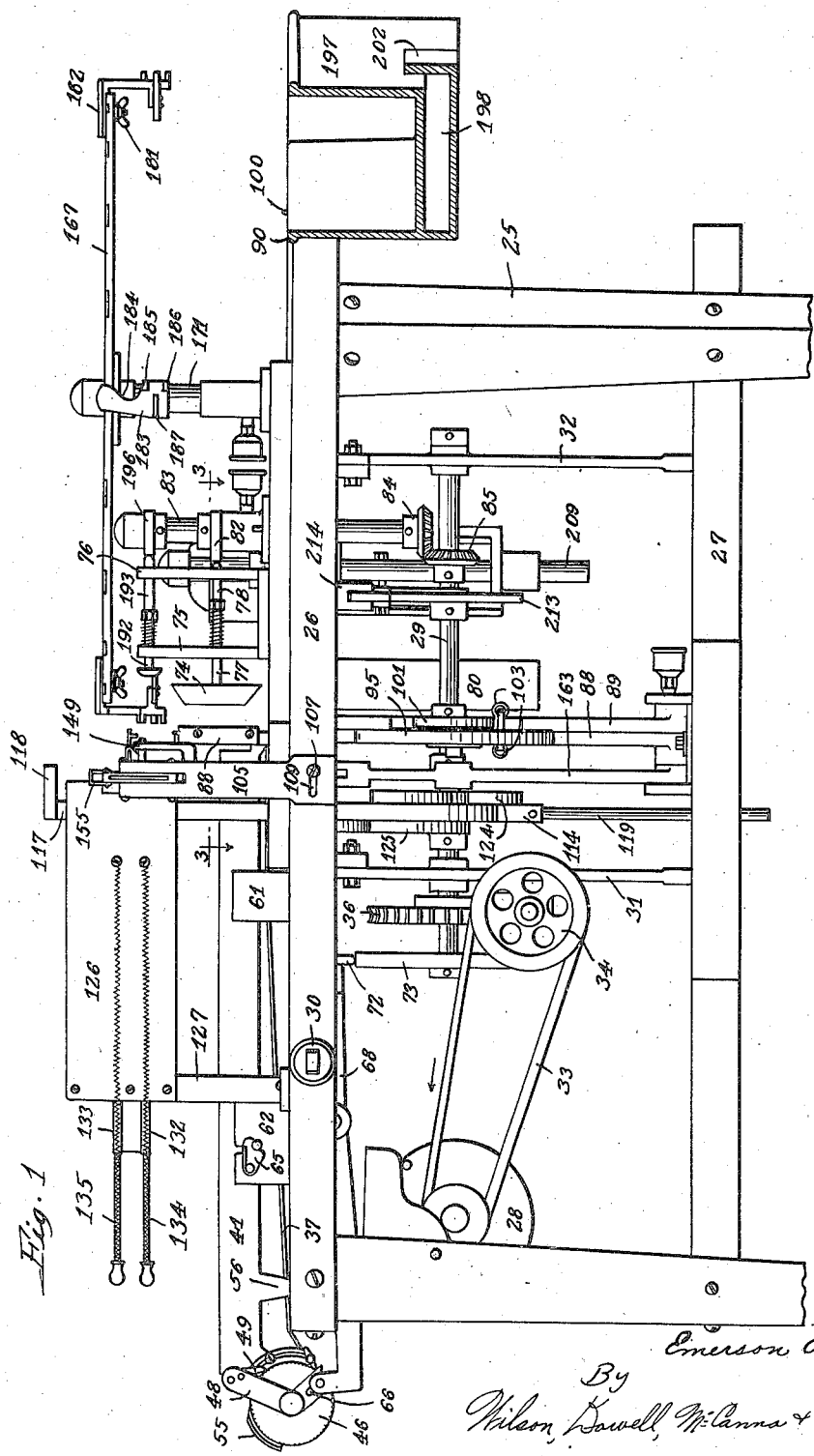
Figure 1 is a side view of a machine embodying the invention.

The invention contemplates a machine for making confections carried on a stick which serves to facilitate the eating of the confection, and is designed particularly for the making of an ice cream confection, though it will doubtless be found to be of value in the making of other types. The invention will, therefore, be described in conection with an ice cream confection, and it will be understood that it is not to be so limited.

The machine includes the table designated generally by the numeral 25 having a flat top 26 and a shelf 27 spaced downwardly therefrom. Carried under the table top 26 is a motor 28 arranged to drive a horizontally disposed shaft 29 carried in bearing brackets 31 and 32 by means of a belt 33, a pulley 34, a worm 35, and a worm wheel 36, the worm wheel being pinned to the shaft 29 and the worm being carried on the bracket 31 as shown in Fig. 5. The supply of current to the motor 28 is controlled through a switch 30. The instrumentalities carried on the table 25 and driven from the shaft 29 fall roughly into four groups, namely, feeding and cutting mechanism, stick feeding and piercing mechanism, transporting mechanism, and dipping mechanism, and we will consider these separately in the order mentioned.

Feeding and cutting mechanism

The ice cream is supplied to the machine in the form of slabs having a cross-sectional area equal to one side of the bar and of a considerable length. This slab is placed on a conveyer belt 37, which belt is carried on pulleys 38 and 39 positioned at opposite ends of a conveyer frame 41. The pulleys 38 and 39 are supported on pins pivotally carried in the frames as shown in Figs. 9 and 10, the pin 40 carrying the pulley 38. The conveyer frame 41 has upstanding side flanges 42 and 43 between which the upper reach of the conveyer belt rests, the flanges serving as guides in the forward movement of the slab of ice cream. The belt 37 has a row of spaced openings 44 adapted for the reception of pins 45 on the pulley 38 for the purpose of driving the belt and preventing slippage between the belt and the pulley. A gear 46 is pinned to one end of the pin 40 and has an outwardly extending hub 47 on which a bell crank lever 48 is rotatably carried. The lever 48 carries a spring pressed ratchet pawl 49 adapted to engage the teeth of the gear 46, indexing the same in response to movement of the lever 48. A plate 51 rests between the gear 46 and the conveyer frame, and has a segment 52 through which a screw 53 passes into the frame for the purpose of adjusting the plate circumferentially about the pin 40. The plate carries a spring pressed ratcheting pawl 54 for the purpose of preventing return rotation of the gear 46. The plate likewise carries a flange 55 overhanging the gear 46 to receive the pawl 49 so as to prevent its contact with the gear 46 during a part of the stroke of the lever 48, the amount depending upon the rotative position of the plate 51 as determined by the segment 52 and screw 53. Therefore, by rotation of the plate 51, the amount of forward movement of the belt 37 may be adjusted and, consequently, the forward movement of the ice cream slab. As shown in Fig. 9, the conveyer frame 41, the belt 37 and the part of the drive therefor which has heretofore been described, is a separate unit capable of removal from the table for convenient access in washing, etc. The conveyer frame 41 has a pair of depending legs 56 at one end adapted to rest upon the top of the table to support the feeding mechanism thereon and a pair of depending legs 57 at the forward end thereof adapted for reception in sockets 58 in a top plate 59 resting on the top of the table. The conveyer frame 41 seats on the table between a pair of upstanding flanges 61 adjacent the top plate 59 and a pair of flanges 62 rearwardly spaced therefrom. The flanges 62 have slots 63 for the reception of screws 64 on the sides of the conveyer frame, and are provided with latches 65 for the purpose of latching the screws into the slots 63.

When the conveyer assembly is positioned on the table, a slot 66 in one arm of the lever 48 thereof receives a roller 67 pinned in one end of an oscillating arm 68 for the purpose of oscillating the belt crank lever 48 and thereby index the conveyer belt forward. The arm 68 is carried on a shaft 69 pivotally attached to the bottom of the table, and a spring 71 is positioned in tension to elevate the rear end of the arm. The forward end of the arm carries a roller 72 which acts against a cam 73 carried on the shaft 29 and driven therefrom. The shape of this cam is best shown in Fig. 11, and is shaped for gradual advancement of the conveyer belt 37 and rapid return of the arm 68 and lever 48 for subsequent engagement of the pawl 48. Thus, upon rotation of the shaft 39, the conveyer belt 37 is intermittently advanced to a point determined by the shape of the cam 73, the amount of the advancement being determined by the position of the segment 52.

An abutment member 74 is positioned at the forward end of the conveyor 37 and serves to limit the forward movement of the ice cream slab. The abutment member is carried in a bracket having forked ends 75 and 76 supporting a rod 77 attached to the abutment member. The rear end of the rod 77 is threaded into a push member 78 and carries a nut 79. The rod 77 and push member 78 are slidable in the bracket, and a spring 81 tends to force these members to the right facing Fig. 5. A cam 82 is carried on a vertical shaft 83 driven by gears 84 and 85, the cam acting against the end of the push member 78 to urge the abutment to its forward position. The abutment moves between the position shown in Figs. 3 and 4, the cam moving the same into the position shown in Fig. 3 simultaneously with the advancement of the conveyer belt so that the ice cream slab strikes the abutment member to limit the position thereof. The position of the abutment member may be determined by threading the rod 77 into and out of the push member 78. A spout 80 extends downwardly from the table top and registers with an opening through the top directly under the abutment member 74 to catch drop from this point of the machine or to receive the products of faulty operation of the mechanism.

The ice cream bar is severed from the slab by means of a pair of knives 86 and 87 best shown in Fig. 18, the knives being carried on vertically disposed arms 88 and 89 by means of screws 91 passing through slots 92 for relative adjustment of the knives and the arms by means of adjustable abutment screws 93. The arms are pivotally carried on a bearing pin 94 rotatably supported on the shelf 27 of the table, and have arcuate portions 95 and 96 providing a central opening 97 between the arms into which cam followers 98 and 99 project for engagement with cams 101 and 102, respectively, the cams being carried on the shaft 29 and being oppositely shaped and positioned therefrom for reciprocation of the knives 86 and 87 between the open position shown in Fig. 3 and the closed position shown in Fig. 4 for the purpose of severing a bar of ice cream from the slab. Springs 103 tend to urge the cam followers into contact with the cams.

*Piercing and stick feeding mechanism*

As an ice cream slab is indexed forward on the conveyer belt, and prior to the operation of the cutting means, sticks are forced into the upper surface of the slab in spaced relationship so that the knives in severing a bar from the forward end of the slab, sever the ice cream midway between two spaced sticks. This mechanism is best shown in Figs. 12–17 and Figs. 20 and 21. This mechanism includes a pair of vertical uprights 104 and 105 supported on the table top adjacent opposite sides thereof by means of screws 106 and 107 passing through slots 108 and 109 for adjustment of the uprights longitudinally of the table so that the spacing between sticks may be varied. A plate 111 (Fig. 15) extends between the uprights 104 and 105 transversely of the table. An abutment 112 is positioned on the plate 111 against which successive sticks such as shown at 113 are adapted to be urged by means of mechanism presently to be described. When the sticks are brought into this position they are held endwise directly above the ice cream slab as shown in Fig. 17. A driving member 114 extends upward through the top of the table and includes a pair of arms 115 and 116 having a crosshead 117 carrying an outwardly projecting finger 118 adapted to contact the upper end of the stick to force the same down into the ice cream slab upon downward movement of the driving member 114. The driving member has a downwardly extending pin 119 which passes through the shelf 27 to guide the driving member in its vertical reciprocating movement. The driving member has an opening 121 through which the shaft 29 passes, and carries a pair of cam followers 122 and 123 adapted to engage cams 124 and 125 carried on the shaft 29, the cams acting to reciprocate the driving member in timed relation with the remaining parts of the machine.

Sticks are fed into position against the abutment 112 from a magazine designated generally by the numeral 126 best shown in Figs. 20 and 21, the magazine being supported at its forward end on the plate 111 and at its rear end on an upright 127 attached to the table top. The magazine consists of spaced side walls 128 and 129 providing a chamber closed on its bottom side and open on the top for the insertion of bundles of sticks, such as shown at 131. A pair of sleeves 132 and 133 at the rear end of the chamber carry rods 134 and 135 having feet 136 and 137 adapted to bear against the row of sticks in the magazine, and urge them forward under spring pressure supplied by springs 138 and 139. The rods are independently slidable in the sleeves so that sticks may be inserted into the magazine while the machine is in operation. For this purpose the rod 135 is drawn outward as shown in Fig. 20, and a bundle of sticks is inserted into the magazine as shown in Fig. 20. Upon release of the rod 135, feeding pressure is supplied to the sticks from this rod and the rod 134 is drawn outward so that the bundle of sticks can be forced downward to the bottom of the magazine as shown in Fig. 21. The sticks pass from the magazine through the plate 111 and into the space between this plate and a second plate 141 spaced forwardly from the plate 111. The plate 141 is supported at one end on the upright 106 and is flanged inwardly near its other end as shown at 142 so as to contact the plate 111 and provide a bottom for the support of the lower end of the sticks as they emerge from the magazine. A shuttle 143 is positioned between the plates 111 and 141 and carries a transverse pin 144 extending therethrough and through slots 145 and 146 in the plates 111 and 141, respectively, the pin receiving the ends 147 and 148 of an actuating fork 149, the fork serving to reciprocate the shuttle longitudinally with respect to the plate 111. The pin 144 is of considerably greater length than the spacing of the plates 111 and 141, and the forked ends 147 and 148 are widely spaced so as to permit of adjustment of the position of the feeding mechanism to accommodate bars of different sizes. The forward end of the shuttle has a forwardly extending finger 151 against which the sticks are caused to abut upon emergence from the magazine and with a shoulder 152 adapted to engage the edge of the stick to cause the same to follow along the plate 111 upon forward reciprocation of the shuttle to move the sticks successively into the position shown in Fig. 16. As the stick reaches the position shown in Fig. 16, a spring pressed latch member 153 pivoted on the plate 141 and extending into the space between the plates 111 and 141 as shown at 154, drops over the edge of the stick, retaining the same in driving position against the abutment 112 permitting the shuttle to return to the position shown in Fig. 15 and leaving the stick in driving position. A pawl 155 (Fig. 12) spans the space between the plates 111 and 141 and is rotatable into and out of a notch 156 in these plates to engage a notch 157 in the shuttle to prevent reciprocation of the shuttle without stopping the machine.

The fork 149 extends downward through the top plate 59, and the table top, and is there attached to a slide 158 reciprocable in a slideway 159 and having a downwardly extending fork 161 adapted to receive a pin 162 carried on a cam lever 163, the latter being mounted on the pin 94 for oscillation thereon, oscillating movement of the arm 163 being brought about by a cam 164 carried on the shaft 29 and actuating the arm through a cam follower 165. The slide 158 is returned by the action of springs 166 and 167 best shown in Fig. 13.

Transporting mechanism

When the bars of ice cream having the sticks inserted therein are severed from the slab by action of the knives 86 and 87, the sticks are engaged by transporting mechanism which carry the bars to a coating station and later to an unloading station. This consists of a wheel designated generally by the numeral 168 (Fig. 2) having an annular rim 169, the wheel being carried at its center on a vertically disposed shaft 171 passing through the top plate 59 and the top of the table and carrying a gear 172 at its lower end meshing with a gear 173 carried on the shaft 83. The gears 172 and 173 have an outer configuration such as shown in Fig. 8, the gear 172 having spaced groups of teeth 174 and dwells 175 cooperable with teeth 176 and dwells 177 on the gear 173, whereby continuous rotation of the shaft 83 brings about intermittent or indexing movement of the gear 172, such movement corresponding with bar receiving elements carried on the wheel.

Bar holders such as shown at 178, 179, etc. are positioned on the rim 169 and serve to receive the bar when it is severed from the ice cream slab by the cutters 86 and 87 and are successively indexed into place opposite the cutters by the indexing movement of the wheel. The bar holders are attached to the rim by means of screws and wing nuts 181 and are adjustable on the rim for the handling of different sized bars. Each of the bar holders consists of a horizontally disposed portion 182 resting on the top of the rim 169 and a vertically disposed portion 183 depending therefrom, the vertically disposed portion being cut away as shown at 184 for the passage of the operator's finger in removing the bar from the holder. The vertically disposed portion has a pair of fingers 185 and 186 on its trailing edge and at its opposite or leading edge carries a trigger or pawl 187 positioned intermediate the fingers 185 and 186, the pawl being pressed toward the fingers by means of a spring 188 so as to grip the stick of the bar between the fingers and the pawl under the tension of the spring. The pawl extends rearwardly beyond the plane of the holder to provide an outwardly extending end 189 adapted to be contacted by a plunger 191 (Figs. 5 and 6) carried on a rod 192 threaded into a push member 193, the rod being supported in the fork 75 and the push member being supported in the fork 76. A spring 194 acts against a nut 195 on the rod 192 to urge the plunger 191 to the right facing Figs. 5 and 6 and free of the pawl 187. A cam 196 carried on the shaft 83 urges the plunger 191 in the opposite direction whereby to contact the pawl.

Thus, as the ice cream slab is indexed forward on the conveyer belt 37 into a position against the member 74, the stick previously inserted into the slab moves into the space between the fingers 185 and 186 and the pawl 187, the pawl having previously been moved to its open position by contact with the plunger 191. Just prior to the operation of the knives 86 and 87, the pawl 187 is released causing the stick to be grasped in the holder as shown in Fig. 7. After operation of the knives, the wheel is indexed sufficiently to bring the next succeeding bar holder into position, and the steps are repeated.

Coating mechanism

When the machine is in operation, each of the bar holders between the receiving station and the unloading station carries a bar, and it will be found that the best point at which the bars can be unloaded from the carrying mechanism is at a point shortly before the receiving station so that the bars will have had time to thoroughly drain and the coating to solidify. Consequently, the major number of the bar holders will be loaded during the normal operation of the machine. A tank designated generally by the numeral 197 extends along the edge of the table under the rim of the wheel 169 through a substantial portion of a circle, in this instance about a half circle. This tank is removably supported on the table top through a flange 90 and pins 100, and is of a depth to carry an adequate supply of coating material, such as chocolate, and is provided with a water chamber 198 in the bottom thereof arranged to be heated by an electric heater 199 connected to a source of power through a suitable switch 201. The water chamber 198 serves to keep the coating material in a proper heated condition. Water is placed in the chamber when desired through a spout 202. A dipper 203 is located at a suitable point in the tank and is received in a cylindrical case 204 seated in the tank and extending to a point near the bottom thereof. The dipper and casing constitute nesting reservoirs for holding coating material during the operation of the machine. The lower end of the casing 204 has a partition 205 carrying a valve 206 adapted to allow the entry of fluid into the cylinder and to prevent the exit therefrom. The lower end of the dipper 203 is likewise provided with a bottom 207 having a valve 208 of similar construction. Through this arrangement upward movement of the dipper in the cylindrical case 204 causes the entry of coating fluid into the cylinder 204, and downward movement of the dipper causes the valve 206 to close and the valve 208 to open, whereby the coating material is transferred to the dipper, substantially the entire previous contents of the dipper spilling over and out of the upper end of the dipper. Thus, reciprocation of the dipper causes a flow of the coating material, bringing about agitation thereof. Special attention is directed to the fact that the contents of the dipper is completely changed between each coating operation. In this way the coating material, such as chocolate in ice cream coating, is distributed back into the main body of coating material where the moisture, which was acquired from the ice cream during the coating operation, is allowed to evaporate. This prevents accumulation of the moisture in the dipper, a serious defect in prior art machines. Vertical reciprocation of the dipper 203 is timed with the indexing of the wheel so that when the dipper is raised upward, a bar such as shown at 203 is immersed in the coating material held in the dipper, the dipper returning to its lowermost position before the next indexing movement of the wheel. The dipper is attached to a vertical rod 209 which moves lengthwise to reciprocate the dipper, and the cylinder 204 is likewise carried on the rod 209, a sleeve 211 being inserted therebetween. The rod 209 is reciprocated by an arm 213 pivotally supported on a bracket 214 carried on the table top, the arm having an internal cam surface 215 and a cam follower 216 cooperating with a cam 217 positioned on the shaft 29, the cam and cam follower being so arranged that the dipper is positively raised and also brought to a positive lower position.

After the coating operation is completed, the bar travels around on the rim 169 above the tank 197, the excess coating draining into the tank. The bars may be removed beyond the end of the tank by manually drawing the stick out of the holder against the tension on the pawl 187, the pawl returning to its closed position, or the bars may be removed automatically by suitable machinery.

In Figs. 22–26 inclusive I have shown a modified form of stick feeding mechanism wherein the shuttle 143 is driven directly from the arm bearing against the cam 164. In this case a lever 221 has a cam follower 222 bearing against the cam 164 and has its upper end bifurcated as shown at 223 to receive the pin 144. A spring 224 continuously urges the lever against the cam. In this form the elements 111 and 141 are provided with arcuate slots 225 and 226 as best shown in Fig. 22 for the reciprocation of the shuttle 143 by the lever 221. A plate 227 is attached to the abutment 112 in spaced relation thereto for the reception of the forward end 151 of the shuttle, the plate serving to guide the shuttle at the end of its movement. A latch designated generally by the numeral 228 is attached to the element 111 and consists of an angle iron latch member 229 having one side projecting through a slot 231 in the element 111, the other side normally resting against the surface of the element 111. A flat spring 232 is fixed to the element 111 by means of screws 233 as best shown in Fig. 25 and serves to retain the latch member in the slot 231. The end of the latch member is beveled as shown at 234 adjacent the stick magazine so as to urge the latch to its open position upon forward movement of the shuttle for the passage of a stick.

The stick magazine is flanged at its upper edge as shown at 235 and has longitudinal slots 236 for the passage of pressure applying mechanism through the sides of the magazine. Ways 237 and 238 are attached to the side of the magazine and carry a carriage 239, the latter being provided with rollers 241, 242, 243 and 244 operating against the way 238, and similar rollers operating against the way 237 for movement of the carriage along the magazine. The carriage has a pin 245 adapted to receive a cable 246 wound on a drum 247 tensioned by means of a spring 248 to draw the carriage forward and apply pressure to the sticks in the magazine. The carriage has a plate 249 having outwardly extending fingers 251 adapted to bear against the end of the row of sticks in the magazine, the plate being supported on the carriage by means of screws 252 passing through a slot 253 in the plate. Thus, the plate can be moved between the full and dotted line position shown in Fig. 24 to relieve the pressure from the sticks or for replenishing the supply of sticks in the magazine.

Attention is directed to the fact that the slab of ice cream is automatically fed into the machine and that the sticks are inserted into the slab prior to the severance of the bar therefrom, as a result of which the sticks are inserted without in any way distorting the shape of the finished bar. It should also be noted that the bar is transported from position to position by means of the stick, and the bar is held by the stick during the coating operations so that a uniform unbroken coating is obtained.

Another advantage of my invention is the fact that the parts may be adjusted for the manufacture of bars of a considerable range of size, the range being wide enough for the manufacture of any bar which may economically be sold at current prices. Improved means are provided for feeding the sticks into position above the ice cream slab and for piercing the slab, rendering this operation positive and involving the use of simple elements. Means are provided whereby the supply of sticks in the magazine may be replenished during the operation of the machine, thus providing for continuous and uninterrupted service.

Another feature of the machine is improved means for coating the bar wherein the dipper is self-replenishing and is so arranged as to provide agitation for the entire reservoir of coating material. The dipper action is smooth and positive, involving a straight reciprocating action.

Substantially all of the parts of the machine which require frequent cleaning are easily accessible or quickly and conveniently removed or disassembled for washing and cleaning purposes.

While I have thus described and illustrated a specific embodiment of my invention, I am aware that numerous alterations and changes may be made without departing from the spirit of the invention, and I do not wish to be limited except as required by the prior art and the scope of the appended claims, in which—

I claim:

1. A confection making machine comprising in combination, bar cutting mechanism, means for feeding a slab of confection material to said cutting mechanism for the severance of bars therefrom, means for inserting sticks into said slab in the areas comprising the bars, prior to the severance of the bars from the slab, means for transporting the bars by the sticks away from the cutting mechanism and means for intermittently operating the transporting mechanism to transport successive bars away from the cutting mechanism prior to the operation of the feeding mechanism and subsequent to the operation of the cutting mechanism.

2. A confection making machine comprising in combination, means for intermittently advancing a slab of confection material, a cutter for severing a bar from the end of said slab at each advancement thereof, driving means for inserting a stick into each bar of confection material, and an endless transporting means for transporting the bars by means of the sticks away from said cutters for subsequent operations thereon.

3. A confection making machine comprising in combination a cutter, means for intermittently advancing a slab of confection through said cutter for the severance of bars therefrom, means for predetermining the amount of said advancement, means for driving sticks in said slab in spaced relation, and means for predetermining the spacing of said sticks in relation to said advancement to cause the sticks to be centrally disposed in the severed bars.

4. A confection making machine comprising in combination a cutter, means for intermittently advancing a slab of confection through said cutter for the severance of bars therefrom, means for predetermining the amount of said advancement including abutment means for limiting the advancement of the slab adjustable to predetermine the size of said bars, means for driving sticks into said slab in spaced relation, and means for predetermining the spacing of said sticks to cause the same to be centrally disposed in the severed bars.

5. A confection making machine comprising in combination a cutter, means for intermittently advancing a slab of confection through said cutter for the severance of bars therefrom, abutment means for limiting the advancement of the slab adjustable to predetermine the size of said bars, means for moving the abutment means from an operative position to contact said slab, and to an inoperative position for the removal of the severed bar, and means for driving each of said means in timed relation.

6. The combination in a confection making machine having means for intermittently advancing a block of confection, of vertically reciprocating driving means for inserting a stick into the confection, a magazine having a horizontally disposed bottom and confining side members for retaining sticks in a row on their ends, spring means for urging said sticks successively to a feeding position, means for feeding laterally from said feeding position in succession to a driving position adjacent said confection, and means for holding said sticks in the driving position releasable in response to advancement of said confection.

7. The combination in a confection making machine, of means for inserting sticks into the confection comprising means for holding the sticks in a piercing position with relation to a slab of confection, a driving member for driving the sticks into said slab, means for successively moving sticks into said holding means, a stick magazine for supplying sticks in succession to said last mentioned means, and a pair of presser members acting on the sticks in said magazine, said members being separately operative for alternate use in the insertion of sticks into the magazine during the operation of the machine.

8. In a confection making machine, the combination of a table having a table top, a shaft below said top extending longitudinally of said table, means for driving said shaft, driving means above the top for inserting a stick into the confection, a cam means above the top for feeding the sticks in succession to a driving position adjacent said confection, means above the top for holding said sticks in the driving position, means for moving the confection to space said sticks in said confection, a plurality of cams spaced longitudinally of said shaft to lie at points below each of said means, and levers acting between said cams and each of said means for actuating said means in timed relationship.

9. The combination in a confection making machine, of means for holding sticks in a driving position with relation to a slab of confection comprising a solid wall for support of a side and edge of a stick throughout a substantial portion of its length, and a member spring pressed against the opposite edge of the stick movable between stick retaining and stick passing positions in response to forced movement of the stick, a vertically reciprocable driving member for driving the sticks into said slab, a horizontally reciprocable shuttle for successively moving said sticks laterally into said holding means, and a horizontally disposed stick magazine positioned in the horizontal plane of the shuttle and holding means for supplying the sticks in succession to said shuttle.

10. The combination in a confection making machine, of piercing means for inserting a stick into the confection comprising an abutment member, a spring pressed latch member spaced therefrom for holding a stick therebetween in a piercing position, a vertically reciprocable driving means for moving the stick with respect to said members to insert the stick in a slab of confection, a horizontally reciprocable shuttle for bringing successive sticks into said piercing position past said latch member, a magazine positioned in the horizontal plane of the shuttle and holding means for supplying sticks in succession to said shuttle, a drive shaft, and means operative from said shaft for independently operating said driving means and said shuttle in timed relationship.

11. The combination in a confection making machine, of a cutter, means for intermittently advancing a slab of confection through said cutter to cut said slab into a succession of bars, means for driving sticks into said bars prior to the severance thereof from the slab, and transporting means arranged to grasp said sticks prior to the severance of said bars to successively transport the bars away from the cutter.

12. The combination in a confection making machine of a cutter, means for intermittently advancing a slab of confection through said cutter to cut the slab into a succession of bars, means for driving sticks into said bars prior to the severance thereof from the slab, and transporting means including a plurality of holders for grasping said sticks prior to the severance of said bars to transport the bars away from the cutter.

13. The combination in a confection making machine of a cutter, means for intermittently advancing a slab of confection through said cutter for the severance of bars therefrom, abutment means for limiting the advancement of said slab, means for driving sticks into said slab in a position to be centrally disposed in the bars, means for transporting the bars away from the cutter after severance thereof, said transporting means having gripping means for receiving the stick at the end of said slab upon advancement thereof, means operated in timed relationship with the advancement of said slab for opening the gripping means prior to said advancement and closing said means subsequent to the advancement thereof, and means for moving said abutment member to an inoperative retracted position for transportation of said bars away from the cutter.

14. The combination in a confection making machine of a cutter, means for intermittently advancing a slab of confection through said cutter for the severance of bars therefrom, abutment means for limiting the advancement of said slab, means for driving sticks into said slab in a position to be centrally disposed in the severed bars, means for gripping said sticks prior to the severance of the bars and for transporting the bars away from the cutter after severance, and means for moving said abutment member to an inoperative retracted position for transportation of said bars away from the cutter.

15. The combination in a confection making machine of a cutter, means for intermittently advancing a slot of confection through said cutter for the severance of bars therefrom, abutment means for limiting the advancement of said slab, means adjustable to predetermine the limiting position of said abutment means to predetermine the size of the bars, means for driving sticks into said slab, and means manually operative to vary the position of said driving means dependent upon the size of said bars to position the sticks centrally therein.

16. The combination in a confection making machine of a cutter, means for intermittently advancing a slab of confection through said cutter for the severance of bars therefrom, means for regulating the amount of said advancement dependent upon the size of the bars, abutment means for limiting the advancement of said slab, means adjustable to predetermine the limiting position of said abutment means to predetermine the size of the bars, means for driving sticks into said slab, means manually operative to vary the position of said driving means dependent upon the size of said bars to position the sticks centrally therein, means for gripping said sticks prior to the severance of the bars and for transporting the bars away from the cutter after severance, and means for moving said abutment member to an inoperative retracted position for transportation of said bars away from the cutter.

17. The combination in a confection making machine of means for advancing a slab of confection material, a cutter for severing a bar from the end of said slab, driving means for inserting a stick into each bar prior to the severance thereof, open jaws positioned for the reception of said stick upon advancement of said slab, means for closing the jaws to grip the stick prior to the severance of the bar, and means for moving the jaws to transport the bar away from the cutter.

18. The combination in a confection making machine of means for advancing a slab of confection material, a cutter for severing a bar from the end of said slab, abutment means for limiting the advancement of said slab to predetermine the size of the bars, driving means for inserting a stick into each bar prior to the severance thereof, open jaws positioned for the reception of said stick upon advancement of said slab, means for closing the jaws to grip the stick prior to the severance of the bar, means for moving said abutment means out of said limiting position, and means for moving the jaws to transport the bar away from the cutter.

19. The combination in a confection making machine of a table, a conveyer for blocks of confection positioned thereon adjacent one end, means for retaining the conveyer on the table releasable for the removal of the conveyer for cleaning, driving means engageable by the conveyer when seated on said table for periodically advancing the confection on the conveyer.

20. The combination in a confection making machine having stick driving mechanism of a stick magazine comprising a guideway for confining a row of sticks on their ends, a pair of spring pressed feet near one end thereof bearing against the row of sticks to apply feeding pressure thereto, and manually operable means for withdrawing one of said feet for the partial insertion of a bundle of sticks at the end of a row and subsequently withdrawing the other of said feet for complete insertion whereby to maintain feeding pressure on said row throughout the insertion operations.

21. A machine for making frozen confections having, in combination, a support on which a block of frozen material is adapted to be placed with one end of the block projecting from said support, means for inserting a carrying stick into said projecting end portion of the block to anchor one end of the stick in the material, and means operative to cut the projecting end portion of the block transversely thereof to form a small brick having a carrying stick embedded therein, and means for engaging said stick prior to the severance of the brick to support the brick upon severance thereof.

22. A machine for making frozen confections having, in combination, means for supporting a block of frozen material, means for advancing the block with a step-by-step motion in an endwise direction, and two knife blades movable into the end portion of said block from opposite sides thereof to cut off a predetermined length of said end portion, and means including operating mechanism having an operative connection with said knife blades and another operative connection with said advancing means coordinated and proportioned for operating said advancing means and said blades in timed relation.

EMERSON A. BOLEN.